[11] 3,624,238

| [72] | Inventor | Daniel H. McKenzie |
| | | Germantown, Tenn. |
| [21] | Appl. No. | 809,563 |
| [22] | Filed | Mar. 24, 1969 |
| [45] | Patented | Nov. 30, 1971 |
| [73] | Assignee | Binswanger Glass Co. |
| | | Richmond, Va. |

[54] LAMINATED TRANSPARENT BULLET RESISTING STRUCTURE
8 Claims, 2 Drawing Figs.

[52] U.S. Cl. .................................................. 161/183,
161/193, 161/204
[51] Int. Cl. .................................................... B32b 17/10,
B32b 27/30
[50] Field of Search ........................................ 161/183,
193, 203, 204; 156/106, 99

[56] References Cited
UNITED STATES PATENTS

| 3,525,658 | 8/1970 | Setz .......................... | 161/183 X |
| 3,532,590 | 10/1970 | Priddle ...................... | 161/204 X |
| 3,488,715 | 1/1970 | Atkins ....................... | 161/203 |
| 3,549,476 | 12/1970 | Dietzel et al. ............. | 161/183 X |
| 2,239,527 | 4/1941 | Kamerer ................... | 161/204 X |
| 3,388,032 | 6/1968 | Saunders ................... | 161/183 |
| 3,388,034 | 6/1968 | McCombie ................ | 161/183 |
| 3,406,086 | 10/1968 | Foster ....................... | 161/183 |
| 3,490,978 | 1/1970 | Shockey et al. ........... | 161/203 X |

FOREIGN PATENTS

| 1,142,818 | 2/1969 | Great Britain |
| 1,367,646 | 6/1964 | France |
| 1,255,250 | 11/1967 | Germany |
| 1,285,122 | 12/1968 | Germany |

*Primary Examiner*—Harold Ansher
*Attorney*—Ralph W. Kalish

ABSTRACT: A bullet resisting structure of laminated character comprising outer faces or plies of safety glass with an intermediate ply formed of a polycarbonate resin.

PATENTED NOV 30 1971  3,624,238

INVENTOR
DANIEL H. MCKENZIE
BY Ralph W. Kalish
ATTORNEY

LAMINATED TRANSPARENT BULLET RESISTING STRUCTURE

BACKGROUND AND SUMMARY OF THE INVENTION

This invention relates in general to bullet resistance and, more particularly, to a transparent laminar structure.

It is an object of the present invention to provide a light weight, transparent structure capable of resisting bullets, which structure embodies ordinary safety glass for its outer layers thereby conducive to marked economy in manufacture.

It is another object of the present invention to provide a bullet resisting structure of the type stated, which is of minimal laminae, having outer layers of conventional safety glass with an intervening ply of a polycarbonate resin sandwiched therebetween so that the structure is fundamentally of simple construction and one which is particularly adapted to facilitating manufacture.

It is a still further object of the present invention to provide a bullet resisting structure of the type stated, having marked toughness, impact strength, and dimensional stability while appearing to the casual observer as but a pane of customarily utilized glass, as for defining teller's and cashier's cages and the like.

It is a still further object of the present invention to provide a bullet resisting structure of the type stated having high resistance to shattering and which structure, being relatively thin, is readily adapted for reception within an edge frame.

It is an additional object of the present invention to provide a bullet resisting structure as described above, which is durable and reliable in usage and which forms a unique protective panel against small arms.

DESCRIPTION OF THE PREFERRED EMBODIMENT

Figure 1:
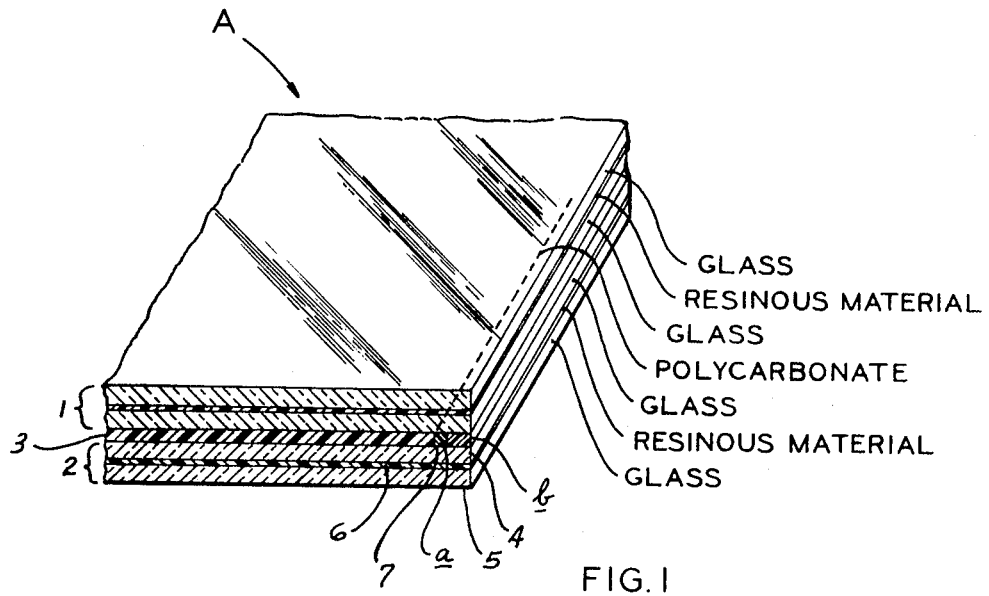
FIG. 1 is a perspective cross sectional view of a bullet resisting structure constructed in accordance with and embodying the present invention.
Figure 2:
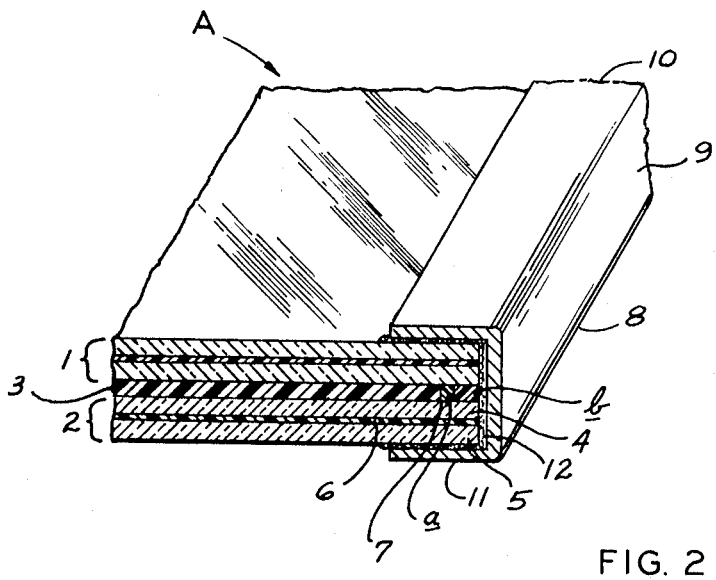
FIG. 2 is a perspective cross sectional view of the bullet resisting structure of the present invention illustrating same as retained within an edge frame member.

Referring now by reference character to the drawings which illustrate the preferred embodiment of the present invention, A generally designates a composite structure comprised of three plies; there being outer layers 1,2 of ordinary laminated safety glass and an intermediate or middle layer 3 of a polycarbonate resin. Layer 1,2 each have a thickness of about seven thirty-seconds inch and, customarily, constitute two thin glass plates, 4,5 with a sheet 6 of non brittle plastic material therebetween, as formed of poly vinyl acetate. Said layers 1,2, being thus of conventional construction, will be exposed to contact with a bullet or other projectile depending upon the particular manner of presentation of structure A in usage.

Intermediate layer 3 is, as stated, constituted of a suitable polycarbonate resin such as, for instance, LEXAN, which is a well-known trademark of General Electric Co. for a polycarbonate. Linear polycarbonates have an unusually high toughness, impact strength, and dimensional stability. The thickness of intermediate layer 3 is approximately one-quarter inch so that the effective, over all thickness of structure A is slightly less than three-quarter inch, being thus, relatively thin.

Intermediate layer 3 is cut throughout its perimeter about one-fourth inch shorter than that of layers 1,2 so as to define a marginal recess 7 for receiving a moisture absorbent agent, indicated at a, such as, for instance, silica gel; as well as for accepting a suitable binder, designated b; for example, a suitable organosilicon polymer, commonly referred to as a silicone; to effect mutual adherence of the components of structure A.

There may be presented about the edges of structure A a relatively rigid frame 8, being formed by extrusion from aluminum sheet or other apt material; and being of channel form in cross section so as to provide an outwardly directed web 9 and side flanges 10,11 for disposition upon the confronting portions of outer layers 1,2, respectively. A conventional adhesive agent, designated 12, may be applied about the inner face of frame 8 for enhancing its securement to the received structure A.

It is apparent that frame member 8 is not critical to the effective use of structure A but is used for promoting facile handling and manipulation thereof, and to generally reinforce and protect said structure.

The polycarbonate resin comprising intermediate layer 3 is, as stated, possessed of properties conducing to high resistance to shattering upon impact by a bullet or like projectile, whereby the impact energy, which is concentrated at the point of contact, is distributed over a larger area by the polycarbonate resin and then passed to the outer layer remote from the layer of impact.

Upon firing of a bullet against either outer layer 1 or 2 the subjected layer does not shatter but, may crack or fragment upon the impact, with the energy thereof being transmitted to layer 3 and spread thereby over its area, with further transfer to the other outer layer of the now diminished force to effect a complete dissipation of the energy without rupturing structure A. It would appear that the polycarbonate resin constituting intermediate layer 3 may have limited resiliency so as to possibly "give" upon impact for conducting to the distribution of the contactive force and thus prevent the concentration of the same at a particular point with ultimate shattering as would be encountered in presently known structures having a thickness of the order of that of structure A.

From the foregoing it will thus be seen that the present invention is relatively light weight, and easily handled and installed without the necessity of developing special supports. Laminating constructions heretofore used for resisting bullets have customarily embodied a thickness in the order of 3 inches whereas structure A is, by comparison, relatively thin, having a thickness of slightly less than three-quarter inch. Furthermore, the utilization of safety glass causes structure A to have an exteriorly usual or seemingly common appearance as contradistinguished from the heavy laminated plate materials used to the present time for safety from bullets. Due to the inexpensive character of safety glass, it is manifest that in the event of cracking of either outer layer 1 or 2 of structure A, the same may be replaced at minimum expense. Thus, the present invention provides a bullet resisting material which is well within the economical range of modest business establishments and without any diminution in safety factors. Structure A maintains the same degree of transparency as would be achieved by normal safety glass so that visibility is in no way diminished.

Having thus described my invention, what I claim and desire to obtain by U.S. Patent is:

1. A bullet resisting laminated structure comprising a first layer of glass, a second layer of glass, a first layer of polyvinyl acetate disposed between said first and second layers of glass, a third layer of glass, a fourth layer of glass, a second layer of polyvinyl acetate disposed between said third and fourth layers of glass, and a layer of polycarbonate material disposed between said second and third layers of glass.

2. A bullet resisting laminated structure as defined in claim 1 and further characterized by said first, second, third and fourth glass layers being of substantially like thickness.

3. A bullet resisting laminated structure as defined in claim 1 and further characterized by said first, second, third and fourth layers of glass having a thickness of approximately seven thirty-seconds inch, and said polycarbonate layer being approximately one-fourth inch thick.

4. A bullet resisting laminated structure as defined in claim 1 and further characterized by a rigid frame engaging said structure about its perimeter; and means for affixing said rigid frame to the adjacent peripheral portion of said structure.

5. A bullet resisting laminated structure as defined in claim 4 and further characterized by said means for fixing the rigid frame member to said structure comprising an adhesive agent.

6. A bullet resisting laminated structure comprising first and second outer layers of safety glass; an intervening layer of polycarbonate material disposed between said first and second outer layers; said intervening layer of a polycarbonate material being reduced about its edge portions relative to said first and second outer layers for developing a continuous marginal recess; a moisture absorbent agent provided in said recess, said moisture absorbent agent having a thickness less than the dimension of said recess; and a binding agent received within said recess in flush relationship with the outer periphery of said laminated structure for sealing said moisture absorbent agent within said recess.

7. A bullet resisting laminated structure as defined in claim 6 and further characterized by said moisture absorbent agent comprising silica gel.

8. A bullet resisting laminated structure as defined in claim 7 and further characterized by said binding agent comprising an organo-silicon polymer.

* * * * *